United States Patent
Hansen et al.

(10) Patent No.: US 7,249,256 B2
(45) Date of Patent: Jul. 24, 2007

(54) ENCRYPTION PROTOCOL

(75) Inventors: Mads Dore Hansen, Hadsund (DK); Joakim Sernbrant, Solna (SE); Lars Romedahl, Sollentuna (SE); Mikael Thuvesholmen, Malmo (SE)

(73) Assignee: Anoto AB, Lund (SE)

( * ) Notice: Subject to any disclaimer, the term of this patent is extended or adjusted under 35 U.S.C. 154(b) by 878 days.

(21) Appl. No.: 10/192,509

(22) Filed: Jul. 11, 2002

(65) Prior Publication Data

US 2003/0021419 A1    Jan. 30, 2003

Related U.S. Application Data

(60) Provisional application No. 60/305,907, filed on Jul. 18, 2001.

(30) Foreign Application Priority Data

Jul. 11, 2001    (SE) .................... 0102474

(51) Int. Cl.
*H04L 9/00*    (2006.01)
*H04N 7/167*    (2006.01)

(52) U.S. Cl. .............. 713/170; 713/168; 380/229; 380/262; 380/277

(58) Field of Classification Search ........ 713/170; 380/229, 262
See application file for complete search history.

(56) References Cited

U.S. PATENT DOCUMENTS

| | | | | |
|---|---|---|---|---|
| 5,745,571 A * | 4/1998 | Zuk | ............................ | 380/285 |
| 6,064,751 A * | 5/2000 | Smithies et al. | ............ | 382/115 |
| 6,189,098 B1 | 2/2001 | Kaliski, Jr. | | |
| 6,304,907 B1 * | 10/2001 | Keronen et al. | ............ | 709/229 |
| 6,385,318 B1 * | 5/2002 | Oishi | ........................ | 380/262 |
| 6,539,479 B1 * | 3/2003 | Wu | ............................ | 713/151 |
| 7,062,651 B1 * | 6/2006 | Lapstun et al. | ............. | 713/168 |
| 7,117,374 B2 * | 10/2006 | Hill et al. | .................... | 713/193 |
| 2002/0034300 A1 * | 3/2002 | Thuvesholmen et al. | ... | 380/256 |
| 2002/0035687 A1 * | 3/2002 | Skantze | ...................... | 713/168 |
| 2003/0012374 A1 * | 1/2003 | Wu et al. | ..................... | 380/44 |
| 2003/0074562 A1 * | 4/2003 | Hansen et al. | .............. | 713/176 |

FOREIGN PATENT DOCUMENTS

EP    0782 115 A2    7/1997

(Continued)

*Primary Examiner*—Ayaz Sheikh
*Assistant Examiner*—Kaveh Abrishamkar
(74) *Attorney, Agent, or Firm*—Birch, Stewart, Kolasch & Birch, LLP (57) ABSTRACT

The present invention relates to a method, a system and a computer-readable medium storing computer-executable components in connection with transfer of information data to a recipient. The invention is based on the idea that generation of random number data and the calculation of digital signatures are performed before information data is accessible to a digital pen. Since asymmetric encryption of data is a demanding operation for said digital pen to perform in terms of processing power, a lot of time can be saved if the generation of random number data and asymmetric encryption of said random number data is performed in advance, when the pen is in an idle, non-communicating mode, for example during battery loading of the pen or when the pen is lifted from the position-coded paper. This alleviates delay times when the pen is in its communicating mode.

19 Claims, 5 Drawing Sheets

FOREIGN PATENT DOCUMENTS

| | | |
|---|---|---|
| EP | 0782 115 A3 | 1/1998 |
| WO | WO 99/64996 | 12/1999 |
| WO | WO 00/72503 A1 * | 11/2000 |
| WO | WO 01/16691 A1 | 3/2001 |
| WO | WO 01/48591 A1 | 7/2001 |
| WO | WO 01/48678 A1 | 7/2001 |
| WO | WO 01/48685 A1 | 7/2001 |
| WO | WO 00/72503 A1 | 11/2002 |

\* cited by examiner

ENCRYPTION PROTOCOL

This application claims priority on provisional Application No. 60/305,907 filed on Jul. 18, 2001, the entire contents of which are hereby incorporated by reference.

TECHNICAL FIELD OF THE INVENTION

The present invention relates to a method, a system and a computer-readable medium storing computer-executable components in connection with transfer of information data to a recipient.

BACKGROUND ART

Traditionally, information is written and distributed by means of pen and paper. However, such paper-based information is difficult to manage and communicate in an efficient way.

Computers are to an ever-increasing extent used for management and communication of information. The information is typically input by means of a keyboard and stored in the computer memory, for example on a hard disk. However, it is a slow process to input information with a keyboard, and there is a significant risk of errors occurring in the process. Graphic information, such as drawings and images, is normally fed to the computer through a separate device, such as a scanner or the like. The process of feeding such information to the computer is time consuming, lengthy, and often yields unsatisfactory results. When the information eventually is located in the computer, it can easily be communicated to others, for example as an e-mail or SMS via an Internet connection, or as a fax via a fax modem.

The present Applicant has proposed a remedy to this problem in the international application WO 01/16691, which is incorporated herein by this reference and in which the Applicant envisages the use of a product having a writing surface which is provided with a position code. The position code, which codes a plurality of positions on the surface, enables electronic recording of information that is being written on the writing surface. The information is written on the surface by means of a digital pen. The pen has a sensor, which detects the position code on the surface. The pen records information by recording the detected position code. The position code is capable of coding coordinates of a large number of positions, much larger than the number of necessary positions on one single product. Thus, the position code can be seen as forming a virtual surface which is defined by all positions that the position code is capable of coding, different positions on the virtual surface being dedicated for different functions and/or actors. The pen communicates with a server with knowledge of the functionality of every position on the virtual surface and any actor associated with each such position.

The above concept can be used for a number of different purposes. The combination of pen and position coded product can be used as an input device to a computer, a PDA, a mobile phone or the like. For example, text and sketches written on a position-coded notepad can be transferred via the pen to a computer. Additionally, the combination of pen and position-coded product allows for global communication, directly from the product via the pen, by the position code on the product being dedicated for such communication. For example, the information registered by the pen can be transformed to a fax message, an e-mail or an SMS, and then be sent from the pen to a recipient. Further, the combination of pen and position-coded product can be used in e-commerce. For example, the digital pen can be used to order an item from a position-coded advertisement in a magazine, by the position code in the advertisement being dedicated for such a service.

In the communication between the different participants in the above concept, it is desirable that the information is sent in a secure way, i.e. by using encryption and digital signatures. If the pen sends confidential information to a recipient, the pen encrypts the information and the recipient will, in order to decipher the information, decrypt it. The pen can use both symmetric and asymmetric encryption. Both types of encryption provides confidentiality (the information is kept secret during transmission) and authentication (assuring the receiver that the identity of the sender of the information is not false). Authentication protects two parties exchanging data from a third party, but it does not protect the two parties from each other. Typically, it should not be possible for any one of the two parties to deny having received or transmitted certain information. When there is not complete trust between the receiver and transmitter, digital signatures are preferably used. By employing asymmetric encryption it is possible to assign digital signatures to the information sent, thereby obtaining non-repudiation (neither the sender nor the recipient of information is able to deny the transmission) of received or transmitted information. The integrity (the information has not been altered during the transmission) of the information must also be guaranteed. This is achieved by using hash functions.

When using symmetric encryption, the same key is used for both encryption and decryption, i.e. the transmitter and receiver shares two copies of the same key. The key is used in conjunction with an algorithm, and different keys will produce different output results from the algorithm. The security of the encryption depends on the secrecy of the key, not the secrecy of the algorithm. This makes it possible to use powerful standard algorithms, such as the Triple Data Encryption Standard (3-DES) algorithm, the Advanced Encryption Standard (AES) algorithm or the International Data Encryption Algorithm (IDEA). The security also depends on the length of the key. The longer the key, the more difficult it is to break the cipher.

Asymmetric encryption works in a similar way, but are based on a pair of keys; one secret, private key and one public key. Often four keys are used, one public key and one private key for confidentiality and one public key and one private key for authentication and digital signature. The sender uses the public key of the receiver to encrypt the information and the receiver uses its private key to decrypt the information. Only a receiver with a private key corresponding to the public key can read the information, thus providing confidentiality. For authentication and digital signature, the sender uses its private key to encrypt the information and the receiver uses the public key of the sender to decrypt the information. If the receiver is able to decrypt the information, it is ascertained that it was encrypted with the corresponding private key, and thus by the corresponding sender. Commonly used public-key algorithms are, for example, the Diffie-Hellman (DH) algorithm and the Rivest-Shamir-Adleman (RSA) algorithm.

Although the legitimate person has signed the information, it is not possible to know from digital signatures alone if the information has been delivered in its entirety. What is needed is a mechanism that delivers some kind of fingerprint of the unique information. Mathematically, these mechanisms are called hash functions. Hash functions take variable-length input strings and convert them to fixed-length output strings, so called hash values. The hash value can then be used to indicate whether a candidate input is likely to be the same as the real input. One-way hash functions are functions that easily compute hash values from the input strings, but with which it is computationally hard to generate another input value that hashes to the same value. This way, hash functions can be used when sending information to ensure the receiver the integrity of the information. The hash value of the information is calculated and sent along with the information. The receiver can then simply make a hash value of the received information and compare this to the hash value sent. If these match, the recipient is also guaranteed a match between the information received and the information sent, on condition that the hash value itself, or the information sent along with the hash value, is protected. Protection of the hash value, or the information sent along with the hash value, is necessary because the hash function itself is not considered to be secret.

In many encryption algorithms random number data is used for different reasons. One is that random data by its nature is difficult to determine or guess, making random numbers suitable as keys.

A problem that has to be solved is that the provision of confidentiality, authentication, non-repudiation and integrity with asymmetric encryption is computationally difficult to perform and requires relatively much processing power.

SUMMARY OF THE INVENTION

An object of the present invention is therefore to provide a solution to, or at least reduce, the above given problem.

This object is achieved by a method in connection with transfer of information data to a recipient in accordance with claim 1, a system for transfer of information data from a sender to a recipient in accordance with claim 10 and a computer-readable medium storing computer-executable components in accordance with claim 19. Preferred embodiments are defined in the dependent claims.

The invention is based on the idea that the generation of random number data to be associated with an information data transmission and the calculation of digital signatures are performed before information data is accessible to the pen, or some corresponding device arranged to detect the position code. This is performed repeatedly, whenever non-repudiation of such information data transmission is to be provided. The information data and the signed random number is sent to a recipient when the information data is accessible. To the pen, information data is the data resulting from the information that is being written on the position coded surface, i.e. the data actually recorded by the pen. Information data can also be prestored data such as, for example, e-mail addresses or credit card numbers. Since asymmetric encryption of data is a demanding operation for the pen to perform in terms of processing power, a lot of time can be saved if the generation of random number data and asymmetric encryption of said random number data is performed in advance, when the pen is in an idle, non-communicating mode, for example during battery loading of the pen or when the pen is lifted from the position-coded paper. This alleviates delay times when the pen is in its communication mode.

The operations of generating random number data to be associated with an information data transmission and calculating digital signatures before information data is accessible could also be applied at a server communicating with the pen, whenever non-repudiation of such information data transmission is to be provided. The pen sends requests to the server, asking the server which service handler that corresponds to the recorded position code. As the position code was recorded from a writeable surface, this server is also known as a paper look-up server, i.e. a server running a paper look-up service. When sending information data from the paper look-up service to the pen, the data includes which service handler the pen should contact. Said operations are preferably performed at the paper look-up service, before the paper look-up service information data actually is accessible to the service, when transferring information data to the pen. Since there is a great number of pens present in the system, the paper look-up service continuously has to compute a great number of signatures. By performing the operations at the paper look-up service, before the data is accessible, less hardware for computation of signatures has to be used, making the system significantly cheaper, since this type of hardware is expensive. The response time for a paper look-up service to answer a pen request will also be shorter.

According to an embodiment of the invention, it can be necessary to encrypt the random number data at the sender, i.e. providing the random number data with confidentiality. Preferably, the random number data is encrypted before information data is accessible to the sender, thus reducing delay times.

When sending data from the sender to the recipient, it is sometimes necessary to encrypt the information data. One such case could be when the paper look-up service instructs the pen to contact a service handler. This service handler could, for example, be run by a bank and the information data sent from the pen could be a credit card number. This type of confidential information must be encrypted. It could also be desirable to encrypt the information data sent from the pen to the paper look-up service or vice versa or when sending information data from the service handler to the pen, which data includes instructions how the pen should format and tag the data it shall send to the service handler.

According to an embodiment of the invention, the information data can be encrypted with a prestored symmetric key known to the sender and the recipient. Symmetric encryption is computationally easier to perform than asymmetric encryption. When symmetrically encrypting the information data, only one asymmetric operation has to be performed, and that is the provision of a digital signature.

According to another embodiment of the invention, a random number is generated and evaluated in a hash function. The hash value is then used to symmetrically encrypt the information data.

Since the encryption algorithms are easy to implement, it is possible to provide the algorithms to the pen as well as the paper look-up service and the service handler, if necessary.

Advantageously, the information data is protected in terms of confidentiality using Cipher Block Chaining (CBC) encryption. When using CBC encryption, every information block to be encrypted is XORed with the previously encrypted block, making every encrypted block a function of all the previously encrypted blocks. This makes it difficult to find regularities in the encrypted data and break the CBC key, even if the information to be encrypted contains static data, such as headers or pen identification. To make it even more computationally infeasible for a third party to gain access to the key, in the present invention, random number data is concatenated with the information data in such a way that the random number precedes the information data before performing CBC encryption on the concatenated data. This makes every encrypted block a function of random data, reducing the regularities in the encrypted data even more. The use of CBC encryption of the concatenated data further emphasizes the need for generation of random number data, as well as other above mentioned operations, before information data is accessible.

Further features of, and advantages with, the present invention will become apparent when studying the appended claims and the following description.

BRIEF DESCRIPTION OF THE DRAWINGS

Exemplifying embodiments of the invention will be described in greater detail with reference to the accompanying drawings, in which.

DESCRIPTION OF PREFERRED EMBODIMENTS OF THE INVENTION

Figure 1:
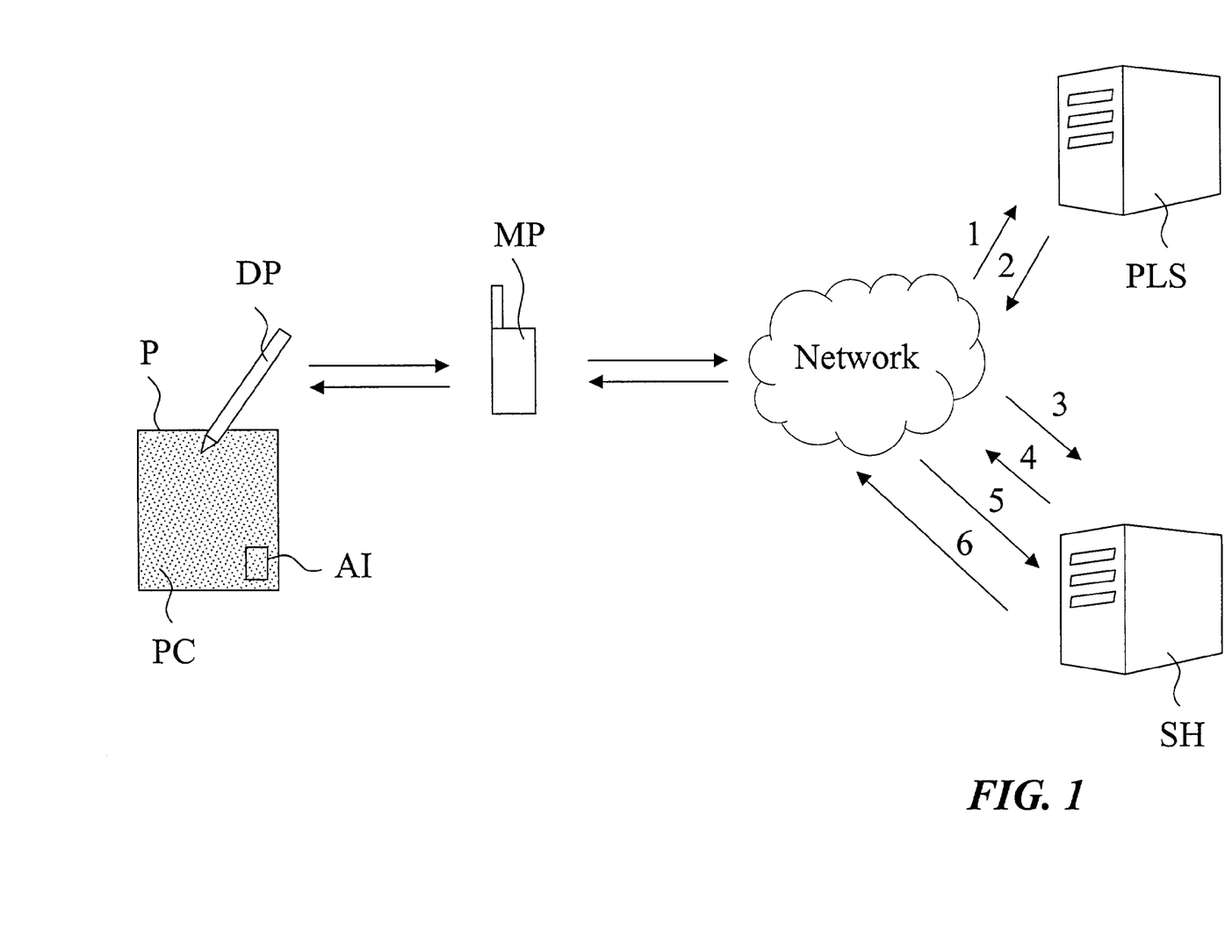
FIG. 1 shows a system for management and communication of information in which the present invention advantageously may be applied.

A system for management and communication of information is shown in FIG. 1. Such a system is further disclosed in the Applicant's international patent applications PCT/SE00/02640, PCT/SE00/02641, and PCT/SE0002659, which applications are incorporated herein by reference. The system of FIG. 1 comprises a plurality of digital pens DP, a plurality of products P with a position code PC, a paper look-up server PLS executing a paper look-up service, and a plurality of service handler units SH. The paper look-up service comprises one or more servers communicating with a database containing the virtual surface formed by the position code and information related thereto. This virtual surface contains all positions that the position code is capable of coding and the functionality of every position on the virtual surface and the actor associated with each such position. The service handler unit SH is a server unit effecting a service, such as storing or relaying digital information, or initiating transmission of information or items to a recipient.

When the digital pen DP is operated to mark an activation icon AI on the position-coded product P, the pen DP initiates an operation to forward a message to the paper look-up server PLS (step 1), for example via short-range radio transmission to a mobile phone MP acting as a modem for connection to the paper look-up server PLS. The message contains a unique pen identifier and at least one position from the digital information that has been recorded electronically on the writing surface of the product P. Based on the position content of the message, the paper look-up server PLS instructs the digital pen DP to contact a specific service handler unit SH (step 2). The pen DP then sends the message to the service handler unit SH (step 3), which instructs the pen DP on what data to send, and how to format and tag that data (step 4). After having received the requested data from the pen DP (step 5), the service handler unit SH returns a verification thereof to the pen DP (step 6).

The present invention can be applied in the system for management and communication of information in FIG. 1 as will be described in the following. The pen DP makes preparations before recording information data by generating random numbers and signing, whenever non-repudiation of information data transmission is to be provided, and encrypting said random numbers. The pen DP then records information data in the form of a position code PC from the writeable surface P. When the pen DP marks an activation icon AI, the pen DP sends the pen information data, including the unique pen identifier and at least one position from the recorded information, to the paper look-up server PLS. By performing said operations of signing and encrypting the random numbers, the pen DP provides authentication, integrity and non-repudiation of the pen information data before sending it. The pen information data that is recorded by the pen DP, and sent from the pen DP to the paper look-up server PLS can be encrypted, i.e. the data is provided with confidentiality, if considered necessary. In this case a mobile phone MP is used as a modem for connection to the paper look-up server PLS. The paper look-up server PLS performs the operations of generating random numbers and signing and encrypting said random numbers before PLS information data is accessible, thereby providing authentication, integrity and non-repudiation of the PLS information data. The paper look-up server PLS receives the pen information data and sends PLS information data back, instructing the pen DP which service handler SH it should contact. The pen DP makes preparations before receiving PLS information data by generating random numbers and signing and encrypting said random numbers, thereby obtaining authentication, integrity and non-repudiation of the pen information data. The pen DP then sends pen information data to the service handler SH designated by the paper look-up server PLS. If the pen information data that is sent from the pen DP to the service handler SH is considered sensitive, the pen DP provides confidentiality of the data by encrypting it. The service handler SH can make preparations similar to the pen DP and the paper look-up server PLS before the service handler SH receives the pen information data and provides authentication, integrity and non-repudiation of the service handler information data, which data instructs the pen DP on what pen information data to send and how to format and tag the data, before sending the service handler information data to the pen DP. The pen DP makes preparations by generating random numbers and signing and encrypting said random numbers, thereby obtaining authentication, integrity and non-repudiation of the pen information data before receiving the service handler information data and sends the pen information data it has been instructed to send to the service handler SH. If necessary, the pen DP will also provide confidentiality of the pen information data by encrypting it. The service handler SH receives the pen information data and finally sends a verification, provided with authentication, integrity and non-repudiation, thereof to the pen DP.

It should be noted that the paper look-up server PLS possibly could consist of two servers, e.g. one local PLS and one global PLS, which continuously have to compute a great number of signatures. The present invention may advantageously be applied in this case as well.

Figure 2:
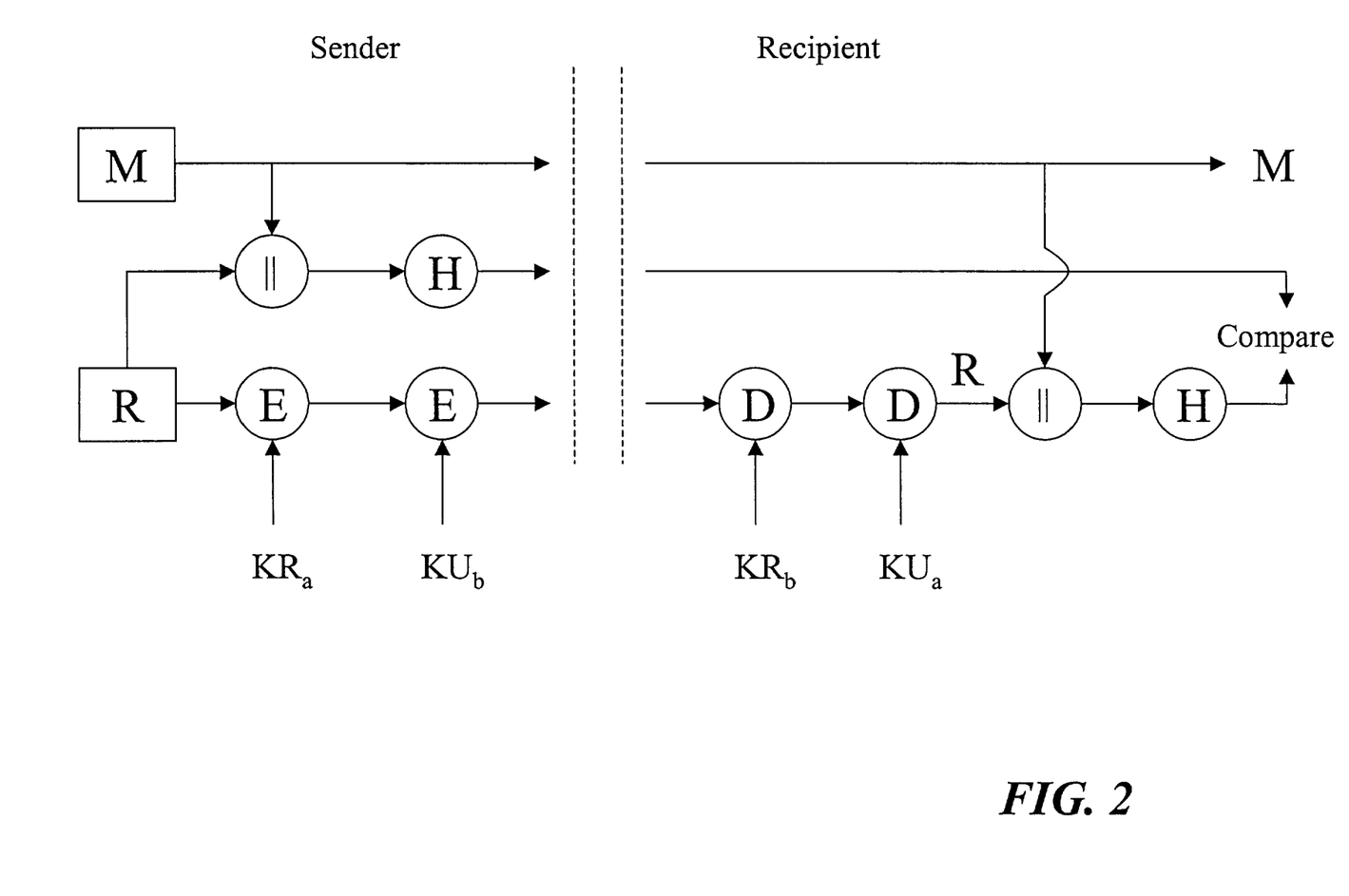
FIG. 2 is a block diagram showing an embodiment of the present invention when providing authentication, integrity and non-repudiation of the information data.

FIG. 2 shows how the present invention provides authentication, integrity and non-repudiation of the data sent and confidentiality of the random number R. In the figure, E denotes encryption and D decryption. A random number R is generated and encrypted with the private key $KR_a$ of the sender, which encryption provides the digital signature. The random number R is then encrypted with the public key $KU_b$ of the receiver, which encryption provides the confidentiality of the random number R. These operations are performed before the information data M is accessible. When information data M is accessible, the information data M is concatenated with the random number R, this is denoted M∥R. The hash value of M∥R, H(M∥R), is calculated and sent along with the signed and encrypted random number R and the information data M. Note that the information data is, in this case, not encrypted.

The recipient then decrypts the encrypted random number with the private key of the recipient $KR_b$ and with the public key of the sender $KU_a$. The random number R is concatenated to the received information data M on the recipient side. The concatenated data is evaluated in a hash function, which operation produces a hash value. The hash value is compared to the received hash value H(M∥R). If neither the information data M, nor the random number R, or both, have been altered, the comparison will match.

Figure 3:
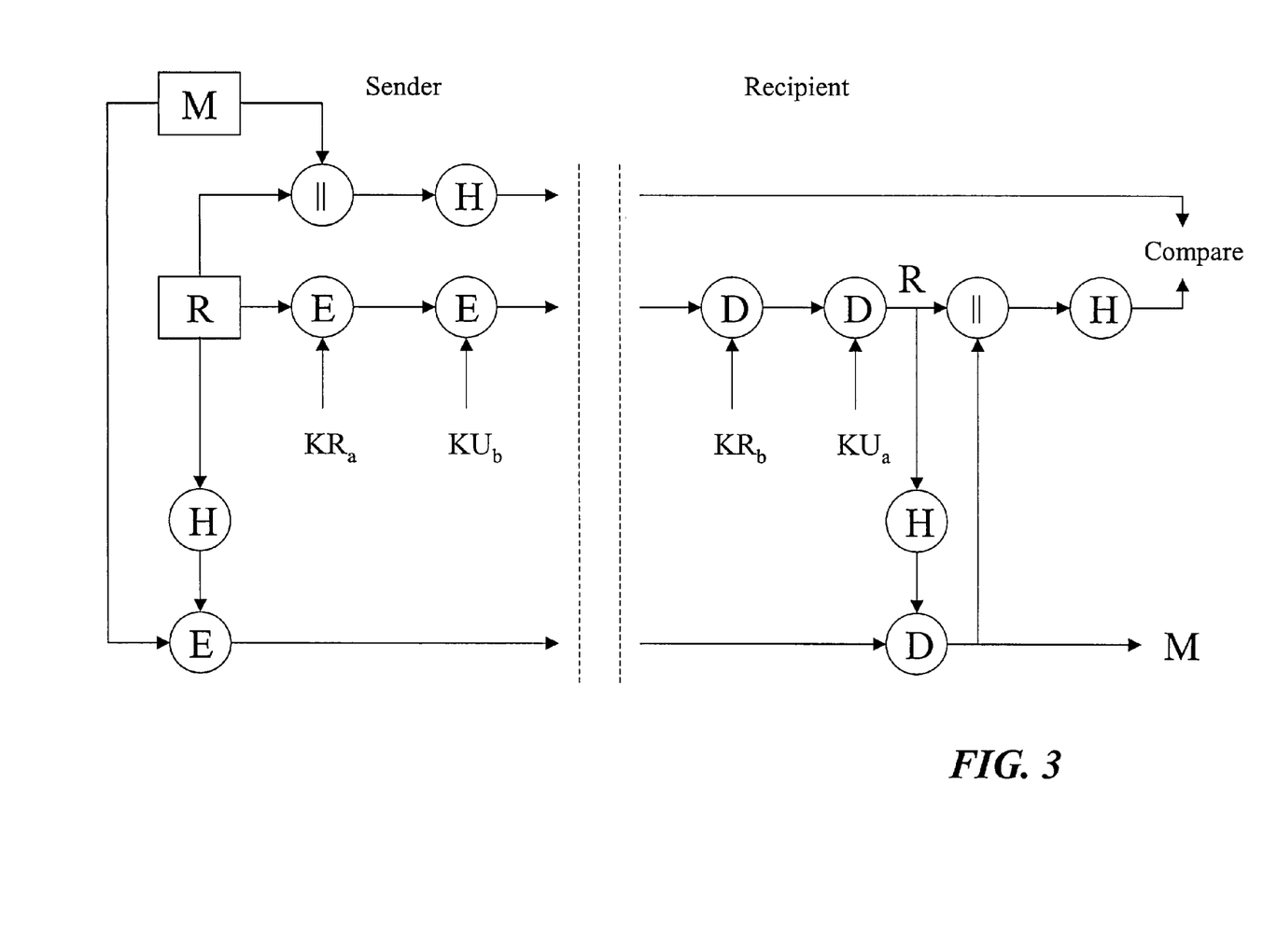
FIG. 3 is a block diagram showing another embodiment of the present invention when providing authentication, integrity, non-repudiation and confidentiality of the information data.

FIG. 3 shows how the present invention provides authentication, integrity, non-repudiation and confidentiality of the information data. In addition to the operations performed in FIG. 2 on the sender side, the random number R is evaluated in a hash function. The information data M is symmetrically encrypted E, using hash value H(R) as a key, providing confidentiality of M. The hash value of M∥R H(M∥R), is calculated and sent along with the signed and encrypted random number R and the encrypted information data M.

The recipient then decrypts the encrypted random number with the private key of the recipient $KR_b$ and with the public key of the sender $KU_a$. The random number is evaluated in a hash function and the result H(R) is used to symmetrically decrypt the encrypted information data M. The random number R is concatenated to the received information data M on the recipient side. The concatenated data is evaluated in a hash function and the resulting hash value is compared to the received hash value H(M∥R). As described in FIG. 2, if neither the information data M, nor the random number R, or both, have been altered, the comparison will match. Because the random number is kept secret from a third party, it is not possible for a third party to decipher the encrypted information data.

Figure 4:
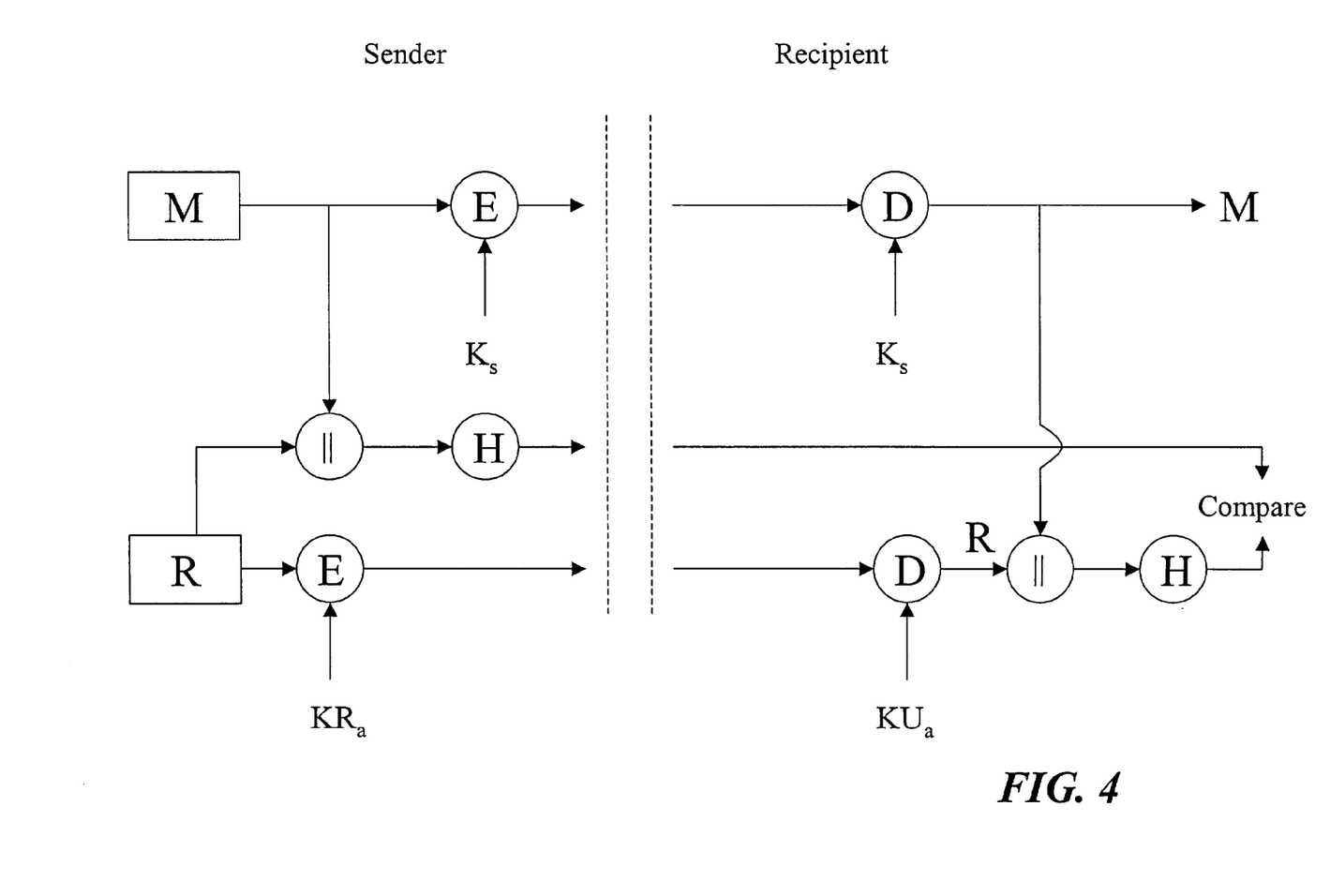
FIG. 4 is a block diagram showing a further embodiment of the present invention when providing authentication, integrity, non-repudiation and confidentiality of the information data.

FIG. 4 shows how the present invention provides authentication, integrity, non-repudiation and confidentiality of the information data. A random number R is generated and encrypted with the private key $KR_a$ of the sender, which encryption provides the digital signature. These operations are performed before the information data M is accessible. When information data M is accessible, the information data M is concatenated with the random number R and the hash value of the concatenated data H(M∥R) is calculated. The information data M is symmetrically encrypted, using a prestored symmetric key $K_s$ known by the sender and the recipient, which encryption provides confidentiality of M. The hash value, the signed random number and the encrypted information data is sent to the recipient.

The recipient then decrypts the signed random number with the public key of the sender $KU_a$ and the encrypted information data with the prestored symmetric key $K_s$. The random number R is concatenated to the received information data M on the recipient side. The concatenated data is evaluated in a hash function and the resulting hash value is compared to the received hash value H(M∥R). As described in FIG. 2, if neither the information data M, nor the random number R, or both, have been altered, the comparison will match. Because the prestored symmetric key is kept secret from a third party, it is not possible for a third party to decipher the encrypted information data.

Figure 5:
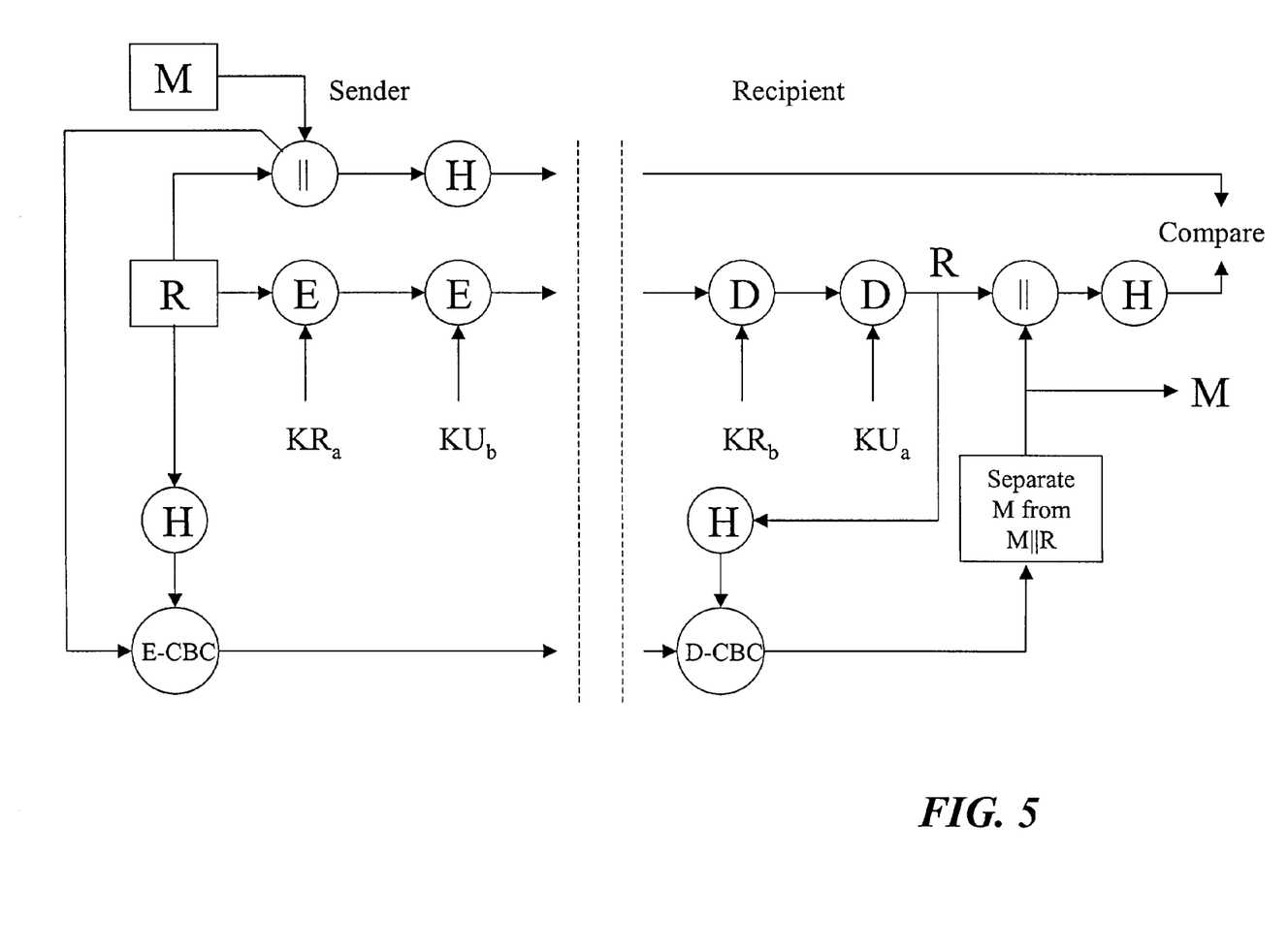
FIG. 5 is a block diagram showing yet another embodiment of the present invention when providing authentication, integrity, non-repudiation and confidentiality of the information data.

FIG. 5 shows how the present invention provides authentication, integrity, non-repudiation and confidentiality of the information data. In FIG. 5, the concatenated data M∥R is CBC (Cipher Block Chaining) encrypted E-CBC using the hash value of the random number H(R) as a key. When employing CBC encryption, every information block to be encrypted is XORed with the previously encrypted block, making every encrypted block a function of all the previously encrypted blocks. Since random number data is concatenated with the information data in the present invention in such a way that the random number precedes the information data before performing CBC encryption on the concatenated data, every encrypted block is a function of random data, reducing regularities, such as headers or pen identification, in the encrypted data.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method for transferring information data acquired by a digital pen to a recipient, the method comprising:
    generating, in the digital pen, a random number to be associated with an information data transmission, whenever non-repudiation of said information data transmission is to be provided, before the information data of that transmission is acquired;
    signing, in the digital pen, said random number using a private key before said information data is acquired; and
    sending said information data and said signed random number to said recipient, when said information data is acquired.

2. The method according to claim 1, further comprising:
    encrypting said random number using a public key before said information data is acquired.

3. The method according to claim 1 or 2, further comprising:
    concatenating said information data with said random number; and
    evaluating the concatenated data in a hash function.

4. The method according to claim 3, including sending the signed and encrypted random number, the hash value of the concatenated data, and said information data to the recipient.

5. The method according to claim 3, including the steps of:
    encrypting said information data using a symmetric key; and
    sending the signed random number, the hash value of the concatenated data and the symmetrically encrypted data to the recipient.

6. The method according to claim 3, including the steps of:
    evaluating said random number in a hash function;
    encrypting said information data using the hash value of the random number as a symmetric key; and
    sending the signed and encrypted random number, the hash value of the concatenated data, and the symmetrically encrypted data to the recipient.

7. The method according to claim 3, including the steps of:
    evaluating said random number in a hash function;

CBC encrypting said concatenated data using the hash value of the random number as a key; and sending the signed and encrypted random number, the hash value of the concatenated data and the encrypted data to the recipient.

8. The method according to claim 1, wherein said recipient is a paper look-up service or a service handier.

9. The method according to claim 1, wherein said recipient is a digital pen, a paper look-up service or a service handler.

10. A system for transferring information data acquired by a digital pen from the digital pen to a recipient, wherein the digital pen includes:

means arranged to generate, in the digital pen, a random number to be associated with an information data transmission, whenever non-repudiation of such information data transmission is to be provided, before the information data of that transmission is acquired;

means arranged to sign, in the digital pen, said random number using a private key before said information data is acquired; and means arranged to send said information data and said signed random number to said recipient, when said information data is acquired.

11. The system according to claim 10, wherein the digital pen further includes:

means arranged to encrypt said random number using a public key before said information data is acquired.

12. The system according to claim 10 or 11, wherein the digital pen further includes:

means arranged to concatenate said information data with said random number; and means arranged to evaluate the concatenated data in a hash function.

13. The system according to claim 12, wherein the digital pen further includes:

means arranged to provide the signed and encrypted random number, the hash value of the concatenated data and said information data for transmission to the recipient.

14. The system according to claim 12, wherein the digital pen further includes:

means arranged to encrypt said information data using a symmetric key; and means arranged to provide the signed random number, the hash value of the concatenated data and the symmetrically encrypted data for transmission to the recipient.

15. The system according to claim 12, wherein the digital pen further includes.

means arranged to evaluate said random number in a hash function, means arranged to encrypt said information data using the hash value of the random number as a symmetric key; and means arranged to provide the signed and encrypted random number, the hash value of the concatenated data and said information data for transmission to the recipient.

16. The system according to claim 12, wherein the digital pen further includes:

means arranged to evaluate said random number in a hash function;

means arranged to CBC encrypt said concatenated data using the hash value of the random number as a key; and means arranged to provide the signed and encrypted random number, the hash value of the concatenated data and the encrypted data for transmission to the recipient.

17. The system according to claim 10, wherein the recipient is a paper look-up service or a service handler.

18. The system according to claim 10, wherein said recipient is a digital pen, a paper look-up service or a service handler.

19. A computer-readable medium encoded with computer-executable for transferring information data acquired by a digital pen to a recipient, the instructions causing the digital pen to execute the steps of:

generating, in the digital pen a random number to be associated with an information data transmission, whenever non-repudiation of said information data transmission is to be provided, before the information data of that transmission is acquired;

signing, in the digital pen, said random number using a private key before said information data is acquired; and sending said information data and said signed random number to said recipient, when said information data is acquired.

* * * * *